Nov. 5, 1957     L. O. CARLSEN ET AL     2,812,186
WORK HOLDING MECHANISM
Filed Dec. 30, 1955                                                                                        3 Sheets-Sheet 1

INVENTORS
Leonard O. Carlsen
Herman A. Male
BY
Richard W. Treverton
ATTORNEY

Nov. 5, 1957

L. O. CARLSEN ET AL 2,812,186

WORK HOLDING MECHANISM

Filed Dec. 30, 1955

United States Patent Office 2,812,186
Patented Nov. 5, 1957

2,812,186

WORK HOLDING MECHANISM

Leonard O. Carlsen, Rochester, and Herman A. Male, Brighton, N. Y., assignors to The Gleason Works, Rochester, N. Y., a corporation of New York Application December 30, 1955, Serial No. 556,725

8 Claims. (Cl. 279—2)

The present invention relates to a mechanism for rigidly securing a workpiece to the spindle of a machine tool, and is concerned especially although not exclusively to so securing ring-shaped workpieces, such as automotive axle drive ring gears, to the work spindle of a tooth cutting machine.

Heretofore such workpieces have been held by the action of an expanding collet gripping the workpiece bore, to secure the workpiece to the spindle, and by the action of a pivoted pawl of an intermittent indexing mechanism, which has held the spindle against rotation in the spindle housing. The present invention, for the purpose of enabling heavier cuts to be taken than this prior work-holding arrangement can be depended upon to withstand, provides a mechanism in which the bore of the workpiece is gripped by a spring-expanded collet and in which the rear face of the workpiece is secured to a seating surface on the spindle by hydraulic pressure, and, further, in which the spindle is also secured to its housing by a hydraulically expanded clamp which, while independent of the afore-mentioned index pawl, may be controlled by valve means arranged to operate in time with the index mechanism.

According to the invention the mechanism for chucking a workpiece on the spindle comprises a chuck body connectible rigidly to the spindle and having a seat for a rear face of the workpiece, a collet secured to the body and being expansible to grip the bore of the workpiece, a plurality of fingers for engaging a front face of the workpiece, a member carried by the body and supporting the fingers for outward and inward motion respectively to and from engageable relationship with said front face, a draw rod movable axially in the body and so connected to the fingers as to in sequence move the fingers outwardly and draw them rearwardly upon rearward motion of the rod, to thereby draw the workpiece against and clamp it to said seat, an expander movable axially in the body and adapted upon rearward motion to expand the collet, spring means for urging such rearward motion of the expander, and an abutment on the draw rod adapted, upon forward motion of the latter, to engage and move the expander forwardly to thereby allow contraction of the collet.

The foregoing and other features of the invention will appear from the following description of the preferred embodiment illustrated in the accompanying drawings, wherein.

Figure 1:
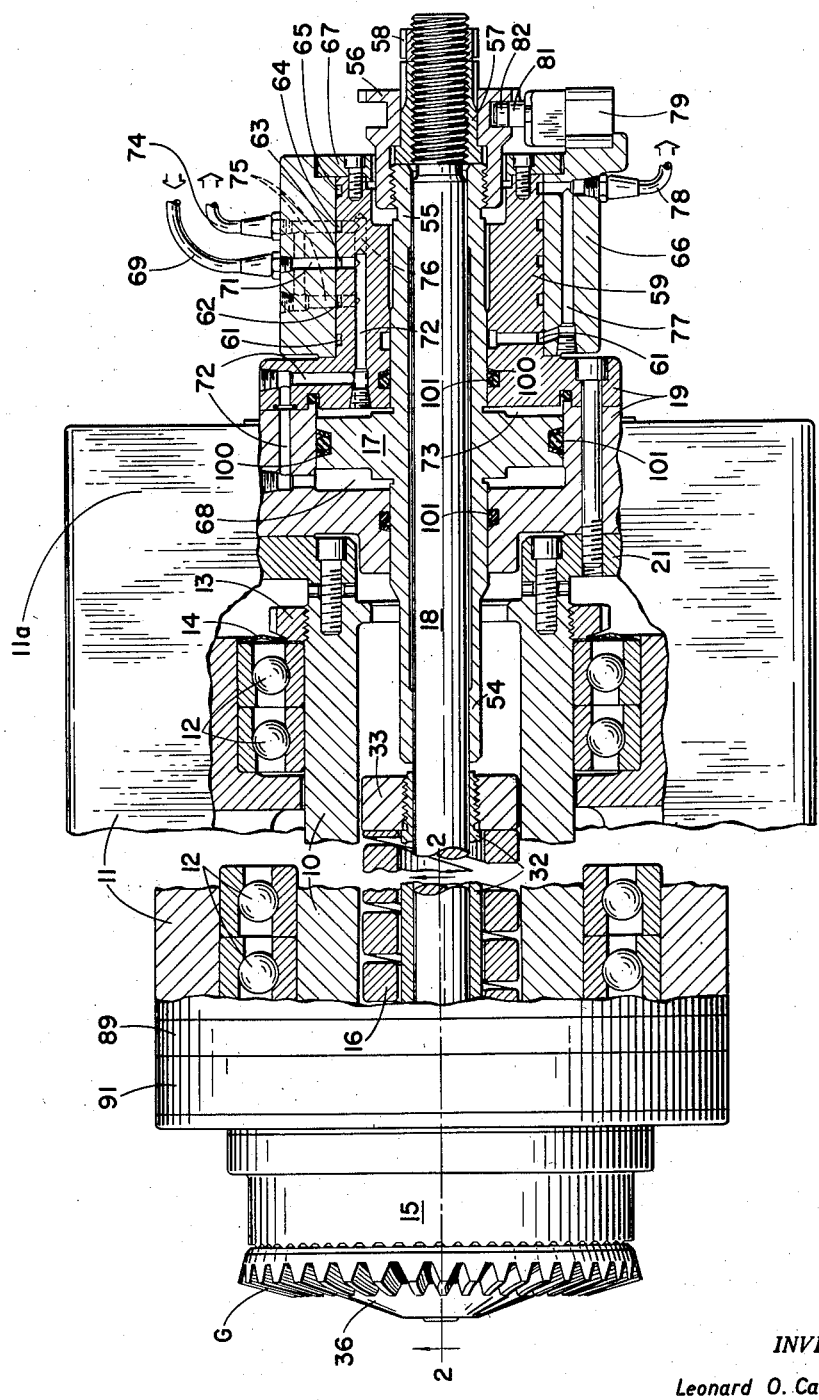
Fig. 1 is a broken side view of the workpiece, the chuck, the spindle and the spindle housing, the view being partly in elevation and partly in vertical section in the plane of the spindle axis.

As shown in Fig. 1 the work spindle 10 is mounted for rotation in the spindle housing 11 on anti-friction bearings 12. These bearings are pre-loaded by tightening a screw-threaded nut 13 on the spindle and are protected by seals 14. Rigidly secured to the spindle is a chuck body 15 to which is clamped the workpiece, in this case bevel ring gear G, such clamping being effected by the combined action of a heavy coil spring 16 and an hydraulically actuated piston 17 which acts through a draw rod 18. The piston is reciprocable in a cylinder 19 rigidly secured to the spindle. In the particular structure shown, which is part of a machine for cutting the teeth of bevel gears by a non-generating or form cutting operation performed with a face mill cutter, the cutting is done one tooth space at a time and hence the spindle is turned in the housing 11 only intermittently, to advance the workpiece by one or more pitches, between successive cutting operations. Such turning or indexing of the spindle is effected by mechanism within part 11a of the housing. This mechanism, whose structure is not a part of the present invention, includes an index plate 21 rigidly secured to the spindle and having peripheral notches engaged by a pawl that is movable with respect to the housing 11. When the index mechanism is not operating, i. e. during the actual tooth cutting, the spindle is clamped rigidly to the housing by means which will presently be described.

Figure 2:
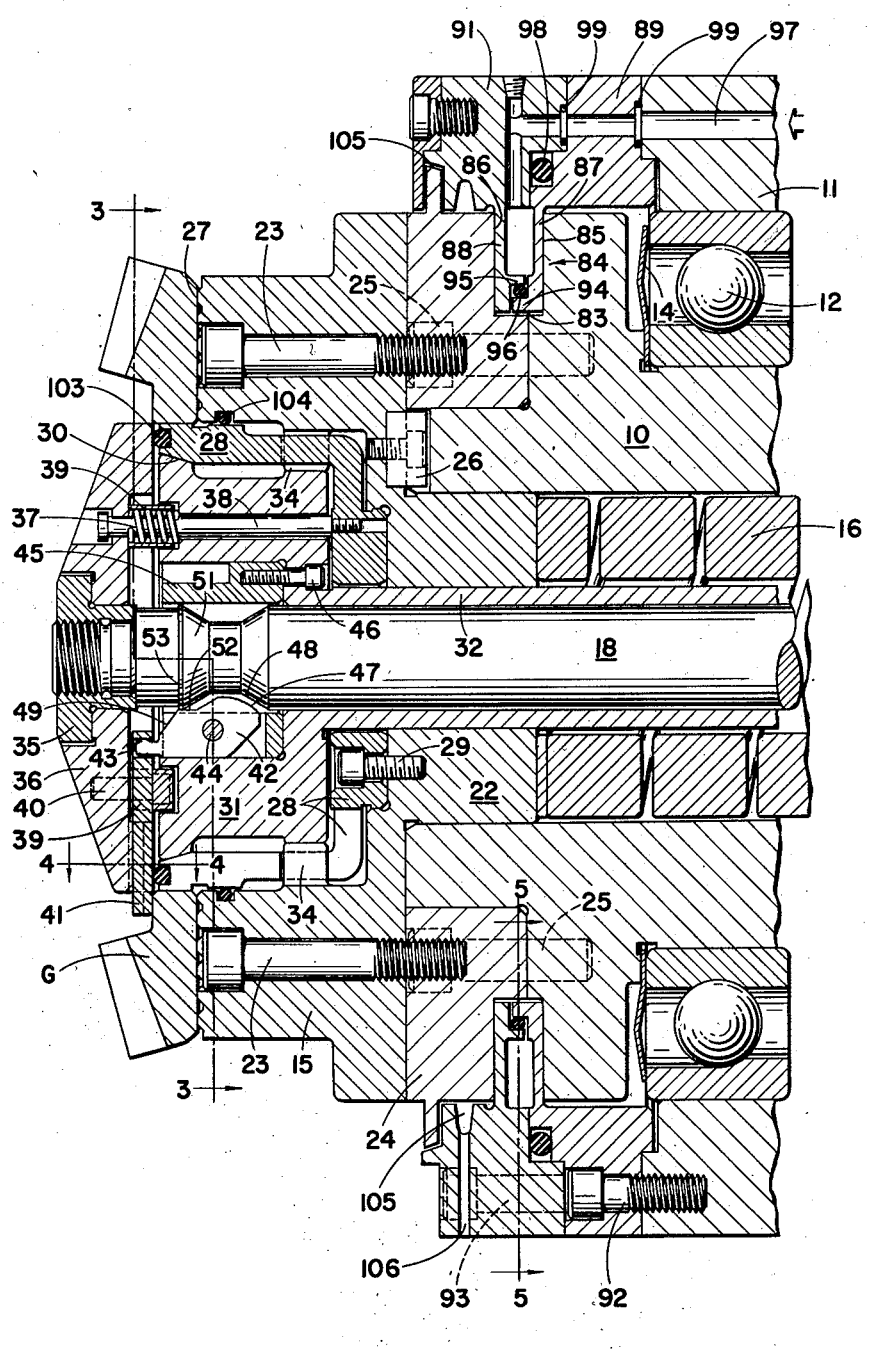
Fig. 2 is a fragmentary sectional view, on a larger scale, in the plane 2—2 of Figs. 1 and 3.
Figure 3:
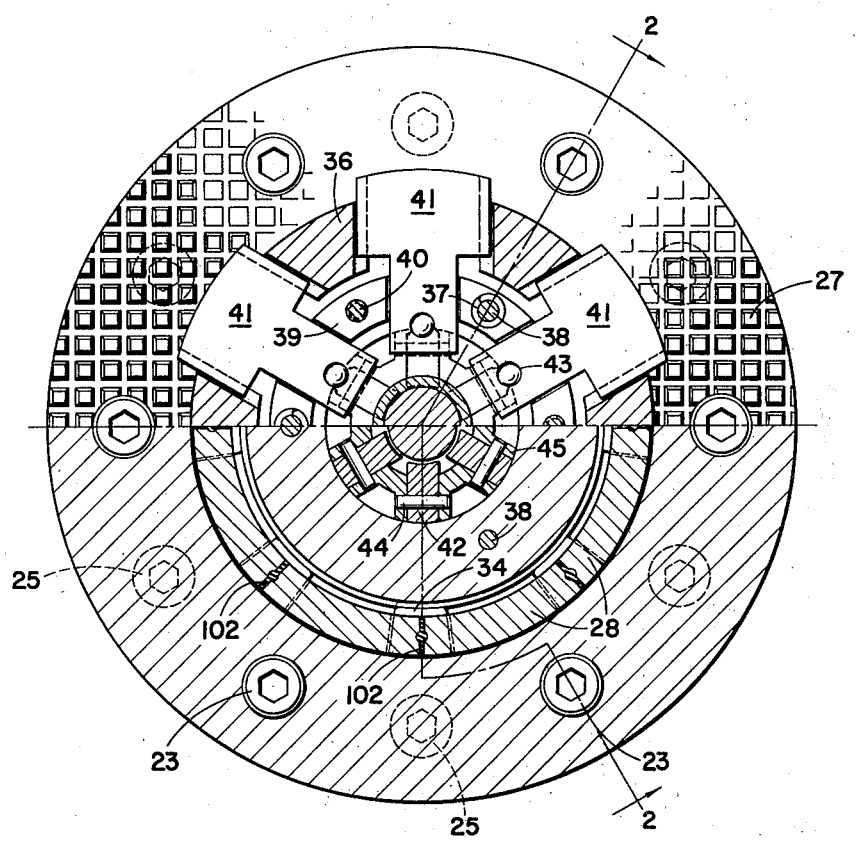
Fig. 3 is a cross-sectional view in the planes 3—3 of Fig. 2, with the workpiece omitted.

Referring now particularly to Figs. 2 and 3, the chuck body 15 has a tapered center 22 received in the similarly tapered bore of the spindle, and is secured by screws 23 to a ring 24 which is in effect a part of the spindle, being secured to the latter by screws 25. The angular relationship of the chuck to the spindle is fixed by a key 26 secured to the chuck body and arranged in a keyway in the face of the spindle. The front face of body 15 is cross-grooved to provide a checkered seat 27 for the rear face of the workpiece G. The bore of the workpiece is centered by a split collet 28 whose inner solid part is secured to the body 15 by screws 29 and whose split skirt is expanded, to center and grip the workpiece bore, by the conical surface 30 of an expander 31 when the latter is drawn rearwardly (to the right in Figs. 1 and 2). The expander has a tubular stem 32 upon the end of which a nut 33 is screw-threaded. The spring 16 extends around this stem and is compressed between the nut and the center 22 of the chuck body, so that it constantly urges the expander to the right. The expander is slidable in the fore of the center 22 and upon lugs 34 which project inwardly from the body 15 through spaces provided between the split portions of the collet.

Figure 4:
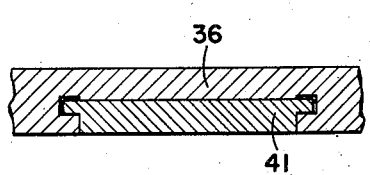
Fig. 4 is a detail sectional view in the plane 4—4 of Fig. 2.

Screw-threaded to the forward end of the draw rod 18 is a nut 35 which comprises a supporting center for a clamp plate 36 and also comprises an abutment on the rod for engaging and drawing the plate rearwardly. Confined between the plate and expander 31 are light springs 37 which are supported by headed screws 38 anchored to the solid part of the collet and extend through aligned openings in the expander and in a ring 39 which is secured to the rear face of plate 36 by screws 40. These springs urge the plate forwardly toward the limit position in which the plate abuts the heads of the screws. A plurality of fingers 41 (six in the illustrated embodiment) are slidable radially in guideways formed in the rim of the plate 36, as best shown in Fig. 4, and in the ring 39. Each finger is actuated by a lever or rocker 42 which has its forward end seated in an opening 43 in the finger, this arrangement permitting small relative motion between the fingers and the rockers in the direction of the spindle axis, irrespective of the radial position of the fingers. The rockers are fulcrumed by pins 44 carried by a ring 45 that is secured to the expander 31 by screws 46.

The rockers are actuated by the draw rod and for this purpose each of them has a cam surface 47 engaged by a conical surface 48 of the rod, when the latter moves forwardly, to retract the fingers, i. e. move them radially inwards. Each rocker also has a cam surface 49 engaged by a conical surface 51 of the rod, when the latter moves rearwardly, to extend the fingers, i. e. move them radially outwards to the position shown in Fig. 2, overlying the front face of the workpiece G. There is also on each rocker a surface 52 parallel to the spindle axis, this surface being engaged by ridge 53 of the draw rod to hold the fingers in their outward position. As shown the surfaces 52 are of sufficient length to engage the ridge 53 throughout a considerable axial motion of the draw rod.

Referring to Fig. 1, the piston 17 has a front tubular extension 54 which constitutes an abutment on the draw rod for abutting the tubular part 32 of the expander when the piston is moved forwardly. The piston also has a rear tubular extension 55 that is secured to the draw rod 18 by screw-threaded fitting 56, nut 57 and jamnut 58. By loosening the jamnut and turning nut 57 the draw rod may be adjusted forwardly or rearwardly with respect to the piston. Surrounding the part 55 is a journal part 59 having a plurality of peripheral grooves 61, 62, 63, 64 and 65; and rotatably fitting the journal part over these grooves is a fluid distributor ring 66 which is held in place by a retainer 67 secured to the journal part. Hydraulic fluid may be conducted to or from front cylinder chamber 68 through a flexible conduit 69, passage 71 in the distributor ring, groove 63, and a connecting passage 72 in the cylinder housing 19. Fluid may be conducted to or from rear cylinder chamber 73 through a flexible conduit 74, passages 75 in the distributor ring, grooves 62 and 64, and passage 76 in the cylinder housing 19. From grooves 61 and 65 any hydraulic leakage may return to a suitable sump through passages 77 in the distributor ring and a flexible conduit 78. On the collector ring is mounted a switch 79 whose actuating arm 81 carries a roller 82 engaged in a peripheral groove in the fitting 56. The switch, which is not a part of the present invention, is for the purpose of sensing whether the draw rod is in chucking or dechucking position.

In operation, when conduit 74 is connected by a suitable valve to a source of fluid under pressure (not shown) and conduit 69 is connected by the valve to exhaust, fluid enters cylinder chamber 73 and moves piston 17 forwardly, exhausting fluid from chamber 68. During the resulting forward motion of the draw rod the springs 37 first act to move the plate 36 forwardly, thereby releasing fingers 41 from the front face of workpiece G. Then the conical surface 48 acts on the rockers 42 to retract the fingers, radially inwards, to a position clear of the workpiece. About the same time, tubular extension 54 of the piston abuts tubular extension 32 of the expander 31 and moves the latter forwardly against the resistance of spring 16. This action allows the split collet 28 to contract to its normal shape, releasing its grip on the bore of the workpiece G so that the machine operator may now replace it with the next workpiece.

When the pressure and exhaust connections to conduits 69 and 74 are now reversed by operation of the valve, fluid entering chamber 68 moves the piston rearwardly, exhausting fluid from chamber 73. The resulting rearward motion of the draw rod allows the spring 16 to move the expander 31 rearwardly so that the collet 28 is expanded to center and grip the bore of the workpiece. At the same time the conical surface 51 of the draw rod engages the cam surfaces 49 of the rockers 42, causing the latter to move the fingers 41 radially outwards to overlie the front face of the workpiece. Upon continued rearward motion of the draw rod the ridge 53 rides onto surfaces 52 of the rockers, to hold the fingers 41 extended; and finally the nut 35 moves the plate 36 rearwardly causing the extended fingers to clamp the workpiece against seat 27 of the chuck. Thus the rear face of the workpiece is clamped against the seat by the fluid pressure which is acting on the front face of piston 17 (which may be on the order of twenty thousand pounds in the case of a large gear) and, further, the bore of the workpiece is gripped by the collet 28 with great pressure resulting from the tapered expander being urged rearwardly by heavy spring 16 (which in the case referred to may exert an axial force on the order of seven thousand pounds). In this way the workpiece is firmly clamped against motion relative to the chuck body and spindle.

Figure 5:
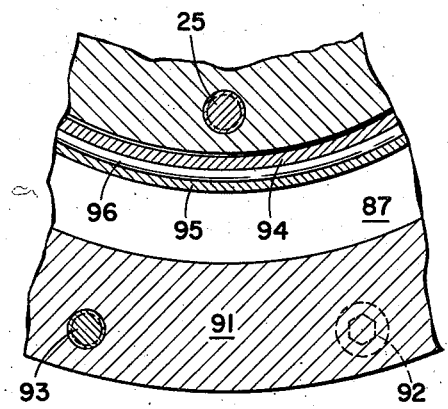
Fig. 5 is a fragmentary cross-section in the plane 5—5 of Fig. 2.

For the purpose of clamping the spindle to the spindle housing there is provided the clamp arrangement shown in Figs. 2 and 5 which is the subject of our divisional application Serial No. 634,960, filed January 18, 1957. According to this arrangement, the spindle is provided with a peripheral groove 83 and the spindle housing with a fluid-expansible tubular annulus 84 fitting the groove. The groove is formed between main section 10 and ring 24 of the spindle, and has plane side walls designated 85 and 86 respectively. The expansible annulus has relatively thin and resilient side walls 87 and 88 respectively formed integrally with ring-shaped sections 89 and 91 of the spindle housing 11, which sections are secured to the main section of the housing by screws 92 and 93 respectively. Preferably the sections 89 and 91 are made of steel and the parts 87 and 88 thereof are heat treated to provide the desired resilience. The annulus side walls have spaced overlapping flanges 94 and 95 between which is disposed a flexible O-ring seal 96. Fluid pressure is applied to the interior of the annulus through a passage 97 leading from a source of pressure and control valve means (not shown) associated with the index mechanism. The arrangement is such that when the index mechanism is not operating, i. e. when the workpiece is being cut, fluid pressure is applied through passage 97 to expand the annulus 84, clamping walls 87 and 88 respectively against walls 85 and 86 of the groove 83. Just prior to indexing the pressure is released and the inherent resilience of walls 87 and 88 restores them to their normal position in which they have a freely rotating or sliding fit with walls 85, 86. The flexible walls 87 and 88 are preferably of like dimensions so that when fluid pressure is applied to them they exert substantially equal clamping pressures on the opposed walls 85 and 86, so that no substantial axial load is applied to the spindle by the clamping action.

As shown, the housing sections 11, 89 and 91 are sealed against leakage by flexible O-ring seals 98 and 99, and similar seals 101 are provided for the piston 17. As shown, fibre spacing rings 100 are used in conjunction with the O-rings 101. For protecting the internal surfaces of the chuck parts the splits in the expansible collet 28 are closed by resilient sealing material 102, and flexible O-ring seals 103 and 104 are disposed in grooves provided respectively on the front face of the collet and on the internal surface of chuck body 15. For protecting the clamping surfaces 85, 86, 87 and 88 a sealing labyrinth 105 with a vent 106 is provided.

The preferred embodiment of the invention having now been described, what is claimed is:

1. A work holding mechanism for chucking a ring-shaped workpiece on a spindle, comprising a chuck body connectible rigidly to the spindle and having a seat for a rear face of the workpiece, a collet secured to the body and being expansible to grip the bore of the workpiece, a plurality of fingers for engaging a front face of the workpiece, a member carried by the body and supporting the fingers for outward and inward motion respectively to and from engageable relationship with said front face, a draw rod movable axially in the body and so connected to the fingers as to in sequence move the fingers outwardly and draw them rearwardly upon rearward motion of the rod, to thereby draw the workpiece against and clamp it to said seat, an expander movable axially in the body and adapted upon rearward motion to expand the collet, spring means for urging such rearward motion of the expander, and an abutment on the draw rod adapted, upon forward motion of the latter, to engage and move the expander forwardly to thereby allow contraction of the collet.

2. A work holding mechanism according to claim 1 in which there is a double acting hydraulic cylinder and piston device having its cylinder connected rigidly to the spindle and its piston connected to the draw rod for moving the latter both forwardly and rearwardly.

3. A work holding mechanism according to claim 1 in which said member slidably supports said fingers for radial motion and there is an abutment on the draw rod engageable with said member for drawing it rearwardly subsequent to the outward motion of the fingers.

4. A work holding mechanism according to claim 3 in which said member is slidable with respect to and is centered by said draw rod.

5. A work holding mechanism according to claim 3 in which resilient means are provided to urge limited forward motion of said member with respect to the chuck body.

6. A work holding mechanism according to claim 1 in which the connection between the fingers and the draw rod includes a rocker for each finger, the rockers being fulcrumed on the expander and being adapted to be rocked thereon in opposite directions by and upon forward motion and rearward motion of the draw rod relative to the expander.

7. A work holding mechanism according to claim 6 in which each rocker has an end portion thereof engageable in an opening in its finger to provide a pivotal connection therewith capable of accommodating limited relative forward and rearward motion between the rocker and finger.

8. A work holding mechanism according to claim 6 in which each rocker has oppositely sloping cam surfaces respectively engageable by similarly sloping surfaces on the draw rod for effecting rocker motion.

References Cited in the file of this patent
UNITED STATES PATENTS

| | | |
|---|---|---|
| 1,561,843 | Garrison | Nov. 7, 1925 |
| 2,450,931 | Bault | Oct. 12, 1948 |
| 2,643,132 | Hunziker et al. | June 23, 1953 |
| 2,716,554 | Lowe | Aug. 30, 1955 |
| 2,719,737 | Fletcher | Oct. 4, 1955 |
| 2,752,175 | Fletcher | June 26, 1956 |